Feb. 19, 1924.
A. MANUEL
AUTOMOBILE THEFT PREVENTIVE
Filed Dec. 24, 1919
1,484,181
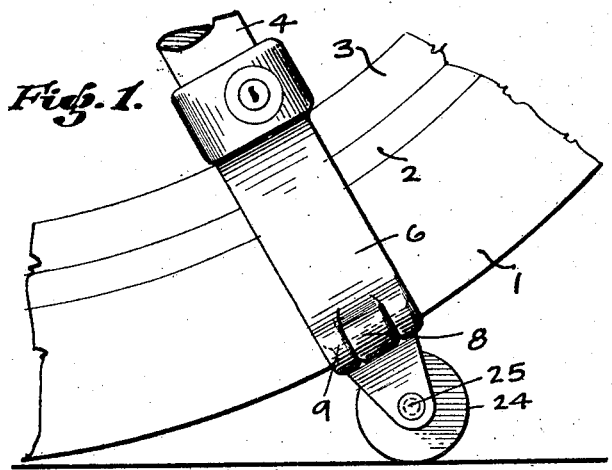
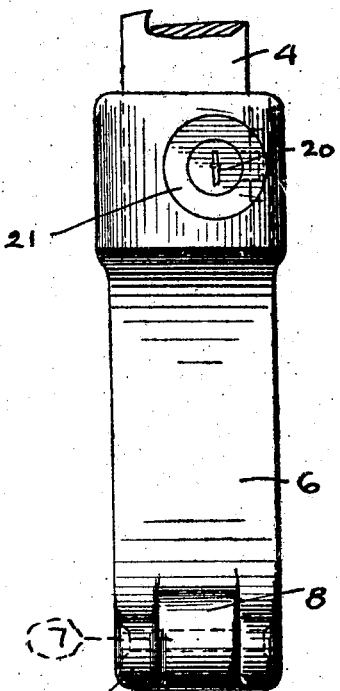
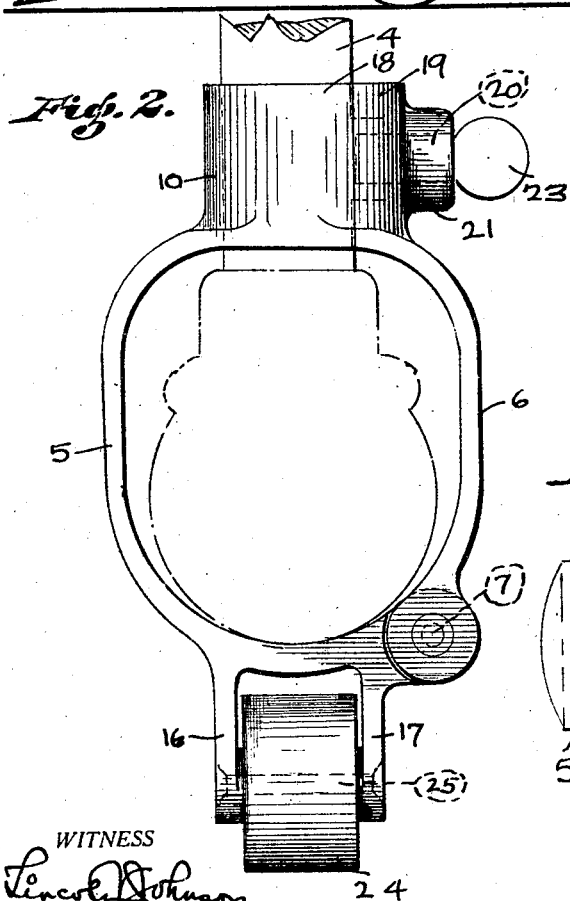
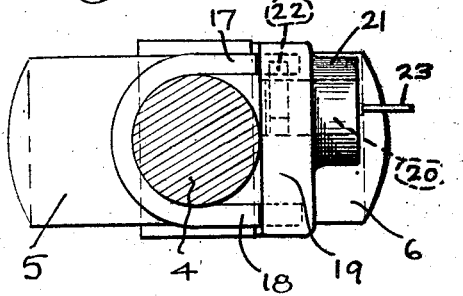
WITNESS
INVENTORS
Augustus Manuel
BY
ATTORNEY Patented Feb. 19, 1924.

1,484,181

UNITED STATES PATENT OFFICE.

AUGUSTUS MANUEL, OF ALAMEDA, CALIFORNIA.

AUTOMOBILE THEFT PREVENTIVE.

Application filed December 24, 1919. Serial No. 347,071.

*To all whom it may concern:*

Be it known that I, AUGUSTUS MANUEL, a resident of the city of Alameda, county of Alameda, State of California, have made a new and useful invention—to wit, Improvements in Automobile Theft Preventives; and I do hereby declare the following to be a full, clear, concise, and exact description of the same.

The invention relates particularly to wheel lugs, and has among its objects the prevention of the rotation of the wheel to which the lug is applied, to prevent the fraudulent operation of the automobile without destroying the tire and rendering the vehicle inoperative.

Other objects and advantages will appear as this description progresses.

In this specification and the annexed drawings the invention is illustrated in the form considered to be the best, but it is to be understood that the invention is not limited to such form, because it may be embodied in other forms; and it is also to be understood that in and by the claims following the description it is desired to cover the invention in whatsoever form it may be embodied.

In the accompanying one sheet of drawings,

Fig. 1 is a fragmentary diagrammatic representation of an automobile wheel having a lug applied thereto constructed in accordance with this invention.

Fig. 2 is an enlarged detail front elevation of the lug.

Fig. 3 is a similar side elevation of the same.

Fig. 4 is a similar plan view from above of the same.

In detail the construction illustrated in the drawings includes a segment of an automobile tire 1, mounted upon a rim 2, fixed to the felloe 3 of the wheel in which the spoke 4 is fixed in the usual manner. The invention comprises a yoke 5, adapted to encircle the tire and the felloe and engage the spoke 4. The hinge plate 6 is pivoted to the yoke 5, on a pintle pin 7 passing thru the lug 8 on the yoke 5 and the lug 9 on the plate 6, that are joined to form a mortice joint with a flush surface, of such a nature that prying instruments cannot be introduced into this hinge for the purpose of taking the yoke 5 and the plate 6 apart at this point. To prevent driving out the pintle pins 7, it is shorter than the width of the plate 6, the end thus being counter sunk within the lugs 9—9. These counter sunk openings are then filled with molten metal of the same substance as the hinge plate 6 by means of oxy-acetylene torch process or otherwise, after which the surface is filed down flush. This effectually prevents the driving out of the pin 7 for the purpose of fraudulently disconnecting the hinge.

The yoke 5 is provided with an integral cast hasp 10 adapted to partially encircle the spoke and is provided with the lugs 17 and 18 fitting into sockets formed in the transverse plate 19 that is integrally formed on the hinge plate 6. The barrel lock 20 is inserted in a socket 21 formed in the plate 19. The latch 22 of the lock is adapted to swing into and out of engagement with a notch formed in the lug 17, when the lock is manipulated by the key 23. In this manner the spoke is completely encircled to fix the lug in position on the wheel. It is thus held against circumferential and lateral displacement on the wheel. Other means are available for attaching the yoke to the spoke, but this form is preferred because it facilitates the attachment and detachment of the lug to and from the wheel.

The roller 24 is journaled on the pin 25 fixed in the side lugs 26 and 27 integrally formed on the yoke 5, the roller 24 is adapted to roll in the same plane as the wheel to which the yoke is attached.

This invention is operated substantially as follows:

When it is desired to lock an automobile or other vehicle against unauthorized use, the yoke 5 is clamped around the wheel, as shown in Figs. 1 and 2, and the hinge plate 6 swung into place and the yoke locked together, effectively locking the lug onto the wheel. Should an attempt be made to tow the car away or to driving it under its own power, the rotation of the wheel would throw the roller 24 into contact with the pavement where it would roll along, preventing the lug from passing under the wheel because of the weight thereon. The wheel 24 will thus roll along dragging the tread of the tire 1 against the pavement, thus acting as a brake to prevent any rapid movement of the vehicle and eventually wearing a hole through the pneumatic tire 1, permitting it to deflate against the pavement increasing the braking or tractive resistance to a point where further progress is practically impossible at any speed consistent with the theft of an automobile. In the meantime the operation of a car under these circumstances would be notice to observers that the car was being fraudulently operated and would bring about notice to the police or authorities that a theft was being committed. If the lug is applied to a front wheel it seriously interferes with the steering or maneuvering of the car, particularly after the tire has worn through.

The fire department of some cities object to automobiles being locked by means of lugs fastened around the wheels to prevent rotation of the wheels, which prohibition includes the provision that automobiles must be left standing with the gearing in "neutral," so that the cars may be pushed by hand, or operated by its own power in the event of a fire in adjoining property. The roller 24 in the present invention permits a car to be so pushed by hand or even driven under its own power for a short distance, such as would serve the purpose of the fire department, without seriously injuring the tread of the tire 1, in such an emergency.

Having thus described this invention what I claim and desire to secure by Letters Patent is:—

1. A wheel lug comprising a yoke adapted to encircle a wheel tire and engage a spoke of the wheel; and a roller on said yoke extending outward therefrom intermediate the sides of said tire.

2. A wheel lug comprising a hinged yoke adapted to encircle a wheel tire and having a hasp thereon adapted to engage a spoke of said wheel; a latch; a lock on said yoke engaging said hasp; and a roller on said yoke extending beyond the periphery of said wheel.

3. A device for preventing the rotation of a vehicle wheel comprising, members clamping about the rim and tire of the wheel, means for locking said members together and a roller pivoted in said members beyond the tread of the tire.

4. A device for preventing the rotation of a vehicle wheel comprising, members clamping about the rim and tire of the wheel, means for locking said members together, means for locking said members to a spoke, and a roller pivoted in said members beyond the tread of the tire.

5. In a device for preventing the free rotation of a vehicle wheel, the combination of a body member having an open side, a lock bar connected at one end to the said body member and adapted to be removably secured thereto at its opposite end, the inner periphery of said body member and the said locking bar being shaped to fit snugly the outer surface of the said vehicle wheel, means for locking the free ends of the said body member and lock bar together, and roller means mounted upon the extreme outer end of the said body member whereby the wheel and body may be moved slidably along the surface of a road when the said roller means is in rolling contact with the surface of said road.

6. The combination with an automobile wheel having a rim and tire, of a body member which is open at one side, and which, when placed radially with respect to the said tire and rim, will fit the outer surface of the said tire and rim snugly, a lock bar hinged at one end to the said body member, and at the other end provided with locking means adapted to engage the free end of said body member, bearings extending from the said body member and normally radially with respect to the said wheel, and roller means revolubly mounted on said bearings whereby a rolling contact is provided between the outer end of the said body and the surface of the road.

7. In a vehicle lock adapted to encompass radially the rim and tire of a vehicle, the combination of a body member and a lock bar hinged thereto, the inner periphery of said body member and lock bar being shaped to fit snugly the outer surface of the said rim and tire, lock means connecting the said lock bar and body member whereby the device may be removably attached to the said vehicle wheel, bearings extending radially and beyond the said body member, and roller means mounted intermediate the said bearings and adapted to provide rolling contact between the wheel and the surface of the road.

In testimony whereof, I have hereunto set my hand at San Francisco, California, this 16th day of December, 1919.

AUGUSTUS MANUEL.

In the presence of—
BALDWIN VALE,
LINCOLN V. JOHNSON.